United States Patent
Yoshimura et al.

(10) Patent No.: US 11,345,765 B2
(45) Date of Patent: May 31, 2022

(54) METHOD FOR RECOVERING UNREACTED ALPHA, BETA-ETHYLENICALLY UNSATURATED NITRILE MONOMER CONTAINED IN LATEX OF CARBOXYL GROUP-CONTAINING NITRILE RUBBER

(71) Applicant: ZEON CORPORATION, Tokyo (JP)

(72) Inventors: Tsutomu Yoshimura, Tokyo (JP); Tomohito Yamanoue, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/981,887

(22) PCT Filed: Mar. 13, 2019

(86) PCT No.: PCT/JP2019/010371
§ 371 (c)(1),
(2) Date: Sep. 17, 2020

(87) PCT Pub. No.: WO2019/181697
PCT Pub. Date: Sep. 26, 2019

(65) Prior Publication Data
US 2021/0002391 A1 Jan. 7, 2021

(30) Foreign Application Priority Data
Mar. 22, 2018 (JP) .............................. JP2018-054076

(51) Int. Cl.
C08F 6/10 (2006.01)
C08F 6/14 (2006.01)
C08F 22/30 (2006.01)

(52) U.S. Cl.
CPC .................. C08F 6/10 (2013.01); C08F 6/14 (2013.01); C08F 22/30 (2013.01)

(58) Field of Classification Search
CPC .............. C08F 6/10; C08F 6/14; C08F 22/30
USPC .......................................................... 526/68
See application file for complete search history.

(56) References Cited

U.S. PATENT DOCUMENTS

| | | |
|---|---|---|
| 2014/0114011 A1 | 4/2014 | Soddemann et al. |
| 2014/0124986 A1 | 5/2014 | Lima et al. |
| 2017/0015819 A1 | 1/2017 | Enomoto et al. |
| 2019/0045863 A1 | 2/2019 | Kitagawa et al. |
| 2019/0091898 A1 | 3/2019 | Yamamoto et al. |
| 2019/0177517 A1 | 6/2019 | Igari et al. |

FOREIGN PATENT DOCUMENTS

| | | | |
|---|---|---|---|
| CN | 103788298 A | * | 5/2014 |
| EP | 2 891 668 A1 | | 7/2015 |
| EP | 3 026 067 A1 | | 6/2016 |
| JP | 2003-277546 A | | 10/2003 |
| JP | 2004-250645 A | | 9/2004 |
| JP | 2017-137399 A | * | 8/2017 |
| JP | 2017-149949 A | | 8/2017 |

OTHER PUBLICATIONS

Sep. 22, 2019 International Preliminary Report on Patentability issued in International Patent Application No. PCT/JP2019/010371.
Jun. 11, 2019 International Search Report issued in International Patent Application No. PCT/JP2019/010371.
Oct. 21, 2021 Office Action issued in Indian Patent Application No. 202017040081.
Nov. 23, 2021 Search Report issued in European Patent Application No. 19771367.0.

* cited by examiner

*Primary Examiner* — Tae H Yoon
(74) *Attorney, Agent, or Firm* — Oliff PLC

(57) ABSTRACT

A method for recovering an unreacted α,β-ethylenically unsaturated nitrile monomer contained in a latex of a nitrile rubber obtained by emulsion polymerizing a monomer mixture comprising an α,β-ethylenically unsaturated nitrile monomer and a carboxyl group-containing monomer is provided. The method includes the steps of: adjusting a pH of the latex of the carboxyl group-containing nitrile rubber to 6.5 or more; decompressing the latex of the carboxyl group-containing nitrile rubber having the pH adjusted to 6.5 or more under a heating condition; and recovering a component evaporated by the decompression under the heating condition.

5 Claims, No Drawings

US 11,345,765 B2

METHOD FOR RECOVERING UNREACTED ALPHA, BETA-ETHYLENICALLY UNSATURATED NITRILE MONOMER CONTAINED IN LATEX OF CARBOXYL GROUP-CONTAINING NITRILE RUBBER

TECHNICAL FIELD

The present invention relates to a method for recovering unreacted α,β-ethylenically unsaturated nitrile monomers contained in a latex of a carboxyl group-containing nitrile rubber.

BACKGROUND ART

Conventionally, nitrile rubber or acrylonitrile-butadiene copolymer rubber has been used as industrial belts, hoses, seals, packings, gaskets and the like, utilizing its oil resistance, mechanical properties, and chemical resistance.

Among nitrile rubbers, the carboxyl group-containing nitrile rubber is suitably used in applications in which excellent wear resistance and high adhesiveness are required since it has excellent wear resistance and adhesiveness.

In general, such a carboxyl group-containing nitrile rubber is produced by polymerizing a monomer mixture containing an α,β-ethylenically unsaturated nitrile monomer such as acrylonitrile and a carboxyl group-containing monomer by emulsion polymerization method with an emulsifier, and then adding a polymerization terminator to the polymerization system at a predetermined polymerization conversion ratio to stop the polymerization, thereby obtaining a latex of the carboxyl group-containing nitrile rubber (see, for example, Patent Document 1).

In the latex of the carboxyl group-containing nitrile rubber thus obtained, unreacted monomers are usually contained. In general, an operation of removing the unreacted monomers from the latex obtained by the polymerization is performed from the viewpoint of reducing content of the unreacted monomers in coagulated waste water generated when the latex is coagulated. Also in Patent Document 1, the operation of removing the unreacted monomers from the latex obtained by the polymerization is performed.

RELATED ART DOCUMENTS

Patent Documents

Patent Document 1: Japanese Unexamined Patent Application Publication No. 2004-250645

SUMMARY OF THE INVENTION

Problem to be Solved by the Invention

On the other hand, from the viewpoint of contributing to further improvement in productivity, it is desired not only to simply remove the unreacted monomers contained in the latex obtained by the polymerization but also to subject the removed monomers to recycle. From such viewpoint, it is desired that a specific monomer can be recovered with high purity among a plurality of types of monomers contained in the monomer mixture.

In view of such circumstances, the present invention has been accomplished. The object of the present invention is to provide a recovering method capable of recovering the unreacted α,β-ethylenically unsaturated nitrile monomer contained in the latex of the carboxyl group-containing nitrile rubber with high purity.

Means for Solving the Problem

In order to achieve the above-mentioned object, the present inventors have conducted extensive research and found that, in the method for removing the unreacted monomers described in the above-mentioned Patent Document 1, it is difficult to selectively recover the α,β-ethylenically unsaturated nitrile monomer, which is a critical raw material of the carboxyl group-containing nitrile rubber, among the unreacted monomers contained in the latex of the carboxyl group-containing nitrile rubber; and by reducing a pressure under a heating condition in a state in which a pH of the latex is adjusted to 6.5 or more, the unreacted α,β-ethylenically unsaturated nitrile monomer can be recovered with high purity. The findings have led to the completion of the present invention.

That is, the present invention provides a method for recovering an unreacted α,β-ethylenically unsaturated nitrile monomer contained in a latex of a carboxyl group-containing nitrile rubber obtained by emulsion polymerizing a monomer mixture comprising an α,β-ethylenically unsaturated nitrile monomer and a carboxyl group-containing monomer, comprising the steps of:

adjusting a pH of the latex of the carboxyl group-containing nitrile rubber to 6.5 or more;

decompressing the latex of the carboxyl group-containing nitrile rubber having the pH adjusted to 6.5 or more under a heating condition; and recovering a component evaporated by the decompression under the heating condition.

In the recovering method of the present invention, it is preferable that a heating temperature is set to 40 to 80° C. when decompressing the latex of the carboxyl group-containing nitrile rubber under the heating condition.

In the recovering method of the present invention, it is preferable that a pressure reduction condition is set to −85 kPa or less in a gauge pressure when decompressing the latex of the carboxyl group-containing nitrile rubber under the heating condition.

In the recovering method of the present invention, it is preferable that the latex of the carboxyl group-containing nitrile rubber is obtained by emulsion polymerizing the monomer mixture comprising acrylonitrile and methacrylic acid.

In the recovering method of the present invention, it is preferable that a polymerization conversion ratio in the emulsion polymerization is 60 to 95%.

In the recovering method of the present invention, it is preferable that the latex of the carboxyl group-containing nitrile rubber is obtained by emulsion polymerizing the monomer mixture further comprising a diene monomer; the method further comprising a step of performing a treatment for removing the unreacted diene monomer before or after the step of adjusting the pH of the latex of the carboxyl group-containing nitrile rubber to 6.5 or more; and in the step of decompressing under the heating condition, the latex of the carboxyl group-containing nitrile rubber that is obtained by performing the treatment for removing the unreacted diene monomer and has the pH adjusted to 6.5 or more is used.

In the recovering method of the present invention, it is preferable that a temperature and a pressure in the treatment for removing the unreacted diene monomer are respectively lower than a heating temperature and a degree of pressure reduction when decompressing the latex of the carboxyl group-containing nitrile rubber under the heating condition.

Effects of Invention

According to the present invention, the unreacted α,β-ethylenically unsaturated nitrile monomer contained in the latex of the carboxyl group-containing nitrile rubber can be recovered with high-purity.

DESCRIPTION OF EMBODIMENTS

The recovering method of the present invention is a method for recovering an unreacted α,β-ethylenically unsaturated nitrile monomer contained in a latex of a carboxyl group-containing nitrile rubber obtained by emulsion polymerizing a monomer mixture comprising an α,β-ethylenically unsaturated nitrile monomer and a carboxyl group-containing monomer, comprising the steps of:

adjusting a pH of the latex of the carboxyl group-containing nitrile rubber to 6.5 or more;

decompressing the latex of the carboxyl group-containing nitrile rubber having the pH adjusted to 6.5 or more under a heating condition; and recovering a component evaporated by the decompression under the heating condition.

<Latex of Carboxyl Group-Containing Nitrile Rubber>

First, the latex of the carboxyl group-containing nitrile rubber used in the present invention will be described.

The latex of the carboxyl group-containing nitrile rubber used herein is a latex of nitrile rubber containing α,β-ethylenically unsaturated nitrile monomer units and carboxyl group-containing monomer units, which is obtained by emulsion polymerization of a monomer mixture containing an α,β-ethylenically unsaturated nitrile monomer and a carboxyl group-containing monomer.

The α,β-ethylenically unsaturated nitrile monomer may be any α,β-ethylenically unsaturated compound having a nitrile group. Examples thereof include acrylonitrile; α-halogenoacrylonitriles such as α-chloroacrylonitrile and α-bromoacrylonitrile; α-alkylacrylonitriles such as methacrylonitrile and ethacrylonitrile; and the like. Among these, acrylonitrile and methacrylonitrile are preferable, and acrylonitrile is particularly preferable. These α,β-ethylenically unsaturated nitrile monomers may be used alone or in combination.

The amount of the α,β-ethylenically unsaturated nitrile monomer to be used in the monomer mixture may be appropriately determined according to the composition of the final carboxyl group-containing nitrile rubber. The amount is preferably 4.9 to 59.9 wt %, more preferably 9.5 to 50.9 wt %, still more preferably 9.5 to 50.5 wt %, particularly preferably 14 to 44.9 wt %, and the most preferably 14 to 44.0 wt %. By controlling the amount of the α,β-ethylenically unsaturated nitrile monomer to be used within the range described above, the obtained carboxyl group-containing nitrile rubber can have an excellent balance of oil resistance and cold resistance.

The carboxyl group-containing monomer can be any monomer that is copolymerizable with the α,β-ethylenically unsaturated nitrile monomer and/or a diene monomer and has one or more unsubstituted (free) carboxyl groups not esterified or the like.

Examples of the carboxyl group-containing monomer include α,β-ethylenically unsaturated monocarboxylic acid monomers, α,β-ethylenically unsaturated polyvalent carboxylic acid monomers, α,β-ethylenically unsaturated dicarboxylic acid monoester monomers, and the like. The carboxyl group-containing monomers also include those having carboxyl groups which form carboxylic acid salts. Moreover, anhydrides of the α,β-ethylenically unsaturated polyvalent carboxylic acids can be used as the carboxyl group-containing monomer because their acid anhydride groups can be cleaved to form carboxyl groups after copolymerization.

Examples of the α,β-ethylenically unsaturated monocarboxylic acid monomers include acrylic acid, methacrylic acid, ethylacrylic acid, crotonic acid, cinnamic acid, and the like.

Examples of the α,β-ethylenically unsaturated polyvalent carboxylic acid monomers include butenedioic acids such as fumaric acid and maleic acid; and itaconic acid, citraconic acid, mesaconic acid, glutaconic acid, allylmalonic acid, teraconic acid, and the like. Examples of the anhydrides of the α,β-ethylenically unsaturated polyvalent carboxylic acids include maleic anhydride, itaconic anhydride, citraconic anhydride, and the like.

Examples of the α,β-ethylenically unsaturated dicarboxylic acid monoester monomers include maleic acid monoalkyl esters such as monomethyl maleate, monoethyl maleate, mono-n-propyl maleate, and mono-n-butyl maleate; maleic acid monocycloalkyl esters such as monocyclopentyl maleate, monocyclohexyl maleate, and monocycloheptyl maleic acid; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, mono-n-propyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, mono-n-propyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, mono-n-propyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate, and monoethyl cyclohexyl itaconate; and the like.

The carboxyl group-containing monomers may be used as single types alone or as a plurality of types combined. For example, when the carboxyl group-containing nitrile rubber is used in an application in which excellent wear resistance or adhesiveness is required, from the viewpoint that these can be further increased, an α,β-ethylenically unsaturated monocarboxylic acid monomer is preferred, acrylic acid and methacrylic acid are more preferred, and methacrylic acid is particularly preferred. Alternatively, when the carboxyl group-containing nitrile rubber is used in an application in which the more excellent wear resistance is required, from the viewpoint that the wear resistance can be further improved, an α,β-ethylenically unsaturated dicarboxylic acid monoester monomer is preferred, a maleic acid monoalkyl ester is more preferred, and maleic acid mono-n-butyl is particularly preferred.

The amount of the carboxyl group-containing monomer to be used in the monomer mixture may be appropriately determined according to the composition of the final carboxyl group-containing nitrile rubber. The amount is preferably 0.1 to 20 wt %, more preferably 0.5 to 15 wt %, still more preferably 1.0 to 10 wt %. By controlling the amount of the carboxyl group-containing monomer to be used within the range described above, the effect of the introduced carboxyl group, such as high adhesiveness and excellent wear resistance, can be properly improved.

In addition, from the viewpoint that rubber elasticity of the finally obtained carboxyl group-containing nitrile rubber can be increased, it is preferable that a diene monomer is also contained in addition to the above-mentioned α,β-ethylenically unsaturated nitrile monomer and the carboxyl group-containing monomer as the monomer mixture used for obtaining the latex of the carboxyl group-containing nitrile rubber used in the present invention.

Any diene monomer can be used without limitation. Examples thereof include conjugated dienes having 4 or more carbon atoms such as 1,3-butadiene, isoprene, 2,3-dimethyl-1,3-butadiene, and 1,3-pentadiene; and non-conjugated dienes having 5 to 12 carbon atoms such as 1,4-pentadiene and 1,4-hexadiene, and the like. Among these, the conjugated dienes are preferable, 1,3-butadiene and isoprene are more preferable, and 1,3-butadiene is still more preferable.

The amount of the diene monomer to be used in the monomer mixture used in the production method according to the present invention may be appropriately determined according to the composition of the final carboxyl group-containing nitrile rubber. The amount is preferably 40 to 95 wt %, more preferably 49 to 90 wt %, and still more preferably 55 to 85 wt %. By controlling the amount of the diene monomer to be used within the range described above, the obtained carboxyl group-containing nitrile rubber can have excellent rubber elasticity while retaining good heat resistance and chemical stability.

In addition to the above-mentioned α,β-ethylenically unsaturated nitrile monomer, the carboxyl group-containing monomer, and the diene monomer used if necessary, the monomer mixture used to obtain the latex of the carboxyl group-containing nitrile rubber used in the present invention may contain additional monomers copolymerizable with these monomers. Any additional monomer can be used without limitation. Examples thereof include α,β-ethylenically unsaturated monocarboxylic acid ester monomers, α,β-ethylenically unsaturated dicarboxylic acid diester monomers, aromatic vinyl monomers, polyfunctional ethylenically unsaturated monomers, self-cross-linkable monomers, copolymerizable antioxidants, and the like.

Examples of the α,β-ethylenically unsaturated monocarboxylic acid ester monomers include (meth)acrylic acid esters (abbreviations for "methacrylic acid esters and acrylic acid esters," and the same applies hereinafter) having $C_1$ to $C_{18}$ alkyl groups such as methyl acrylate, ethyl acrylate, n-butyl acrylate, isobutyl acrylate, n-dodecyl acrylate, methyl methacrylate, and ethyl methacrylate; (meth)acrylic acid esters having $C_2$ to $C_{12}$ alkoxyalkyl groups such as methoxymethyl acrylate, 2-methoxyethyl acrylate, 2-methoxyethyl methacrylate, 3-methoxypropyl acrylate, 4-ethoxybutyl methacrylate, 6-methoxyhexyl acrylate, 4-ethoxyheptyl methacrylate, and 8-methoxyoctyl acrylate; (meth)acrylic acid esters having $C_2$ to $C_{12}$ cyanoalkyl groups α-cyanoethyl acrylate, α-cyanoethyl methacrylate, and cyanobutyl methacrylate; (meth)acrylic acid esters having $C_1$ to $C_{12}$ hydroxyalkyl groups such as 2-hydroxyethyl acrylate, 2-hydroxypropyl acrylate, and 2-hydroxyethyl methacrylate; (meth)acrylic acid esters having $C_1$ to $C_{12}$ fluoroalkyl groups such as trifluoroethyl acrylate and tetrafluoropropyl methacrylate; and the like.

Examples of the α,β-ethylenically unsaturated dicarboxylic acid diester monomers include maleic diesters such as diethyl maleate; fumaric diesters such as dimethyl fumarate; citraconic acid diesters such as dimethyl citraconate; itaconic acid diesters such as dibutyl itaconate; and the like.

Examples of the aromatic vinyl monomers include styrene, α-methylstyrene, vinylpyridine, and the like.

Examples of the polyfunctional ethylenically unsaturated monomers include divinyl compounds such as divinylbenzene; di(meth)acrylic acid esters such as diethylene glycol di(meth)acrylate, and ethylene glycol di(meth)acrylate; and trimethacrylic acid esters such as trimethylolpropane tri(meth)acrylate.

Examples of the self-cross-linkable monomers include N-methylol(meth)acrylamide and N,N'-dimethylol(meth)acrylamide, and the like.

Examples of the copolymerizable antioxidants include N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, and the like.

These additional copolymerizable monomers may be used in combination. The amount of the additional copolymerizable monomers to be used in the monomer mixture used in the production method according to the present invention may be appropriately determined according to the composition of the final carboxyl group-containing nitrile rubber. The amount is preferably 50 wt % or less, more preferably 30 wt % or less, still more preferably 10 wt % or less.

The latex of the carboxyl group-containing nitrile rubber used in the present invention can be obtained by emulsion polymerizing the above-mentioned monomer mixture. At the time of the emulsion polymerization, in addition to the emulsifier, a polymerization initiator, and a molecular weight adjuster, polymerization auxiliary materials which are usually used can be used.

Any emulsifier can be used without limitation. Examples thereof include nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linoleic acid, alkylbenzene sulfonic acid salts such as sodium dodecylbenzene sulfonate, sodium β-naphthalenesulfonate formalin condensates, higher alcohol sulfuric acid ester salts, and alkyl sulfosuccinic acid salts; copolymerizable emulsifiers such as sulfo esters of α,β-unsaturated carboxylic acids, sulfate esters of α,β-unsaturated carboxylic acids, sulfoalkylaryl ethers; and the like. The amount of the emulsifier to be added is preferably 0.1 to 10 parts by weight, more preferably 0.5 to 5 parts by weight relative to 100 parts by weight of the monomer mixture used in the polymerization.

Any radical polymerization initiator can be used as the polymerization initiator without limitation. Examples thereof include inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; azo compounds such as azobisisobutyronitrile, azobis-2,4-dimethylvaleronitrile, azobiscyclohexanecarbonitrile, and methyl azobisisobutyrate; and the like. These polymerization initiators can be used alone or in combination. Preferred polymerization initiators are inorganic or organic peroxides. If a peroxide is used as the polymerization initiator, a combination thereof with a reducing agent such as sodium bisulfite, ferrous sulfate, sodium formaldehydesulfoxylate, or sodium iron ethylenediaminetetraacetate can be used as a redox polymerization initiator. The amount of the polymerization initiator to be added is preferably 0.01 to 2 parts by weight relative to 100 parts by weight of the monomer mixture used in the polymerization.

Any molecular weight adjuster can be used without limitation. Examples thereof include mercaptans such as t-dodecyl mercaptan, n-dodecyl mercaptan, and octyl mercaptan; halogenated hydrocarbons such as carbon tetrachloride, methylene chloride, and methylene bromide; α-methylstyrene dimers; sulfur-containing compounds such as tetraethylthiuram disulfide, dipentamethylenethiuram disulfide, and diisopropyl xanthogen disulfide; and the like. These may be used alone or in combination. Among these, mercaptans are preferable, and t-dodecyl mercaptan is more preferable. The amount of the molecular weight adjuster to be used is preferably 0.1 to 0.8 parts by weight relative to 100 parts by weight of all the monomers.

For the medium of emulsion polymerization, usually water is used. The amount of the water is preferably 80 to 500 parts by weight, and more preferably 80 to 300 parts by weight, with respect to 100 parts by weight of the monomers used for the polymerization.

In the emulsion polymerization, polymerization additives such as polymerization terminators, stabilizers, dispersants, pH-adjusting agents, deoxygenating agents, and particle size adjusters can be further used as needed. If used, polymerization additives of any types can be used in any amounts.

The polymerization conversion ratio in the emulsion polymerization is not particularly limited, but is preferably 60 to 95% more preferably 65 to 90%, and still more preferably 75 to 90%. By setting the polymerization conversion ratio within the above range, high productivity can be realized while appropriately preventing defects caused by the excessively high polymerization conversion ratio, that is, defects such as a gel is generated during the polymerization, processability of the obtained polymer is deteriorated, or properties of the obtained polymer is deteriorated.

<Method for Recovering Unreacted α,β-Ethylenically Unsaturated Nitrile Monomer>

Next, the recovering method according to the present invention will be described.

According to an aspect of the present invention, although the latex of the carboxyl group-containing nitrile rubber can be obtained as described above, in general, a part of the monomers used in the polymerization is contained in an unreacted state in the latex of the carboxyl group-containing nitrile rubber thus obtained.

Among the unreacted monomers contained in such a latex, the present invention focuses on the α,β-ethylenically unsaturated nitrile monomer, which is the critical raw material of the carboxyl group-containing nitrile rubber, and achieve to selectively recover of the α,β-ethylenically unsaturated nitrile monomer.

Hereinafter, recovering method according to the present invention will be described concretely.

In other words, in the recovering method according to the present invention, the pH of the latex of the carboxyl group-containing nitrile rubber obtained by the above-described method is adjusted to 6.5 or more, and the latex of the carboxyl group-containing nitrile rubber having the pH adjusted to 6.5 or more is subjected to decompression under the heating condition. As a result, an evaporated component containing the α,β-ethylenically unsaturated nitrile monomer with high purity (in which the content of monomers other than the α,β-ethylenically unsaturated nitrile monomer is kept low) can be recovered.

Here, the latex of the carboxyl group-containing nitrile rubber obtained by the above-mentioned method is a latex obtained by emulsion polymerizing the monomer mixture containing the α,β-ethylenically unsaturated nitrile monomer and the carboxyl group-containing monomer, and therefore, after the emulsion polymerization reaction, the pH thereof is usually 5.5 or less due to the influence of the unreacted carboxyl group-containing monomer. On the other hand, in the recovering method according to the present invention, the pH of the latex of the carboxyl group-containing nitrile rubber is set to 6.5 or more, and the latex is subjected to the decompression under the heating condition in a state that the pH is set to 6.5 or more, thereby the unreacted monomers are recovered as the evaporated component. By adopting such a method, it is possible to recover the α,β-ethylenically unsaturated nitrile monomer with high purity as the evaporated component.

In particular, the research of the present inventors have found a problem that when the unreacted monomers, in particular the unreacted α,β-ethylenically unsaturated nitrile monomer, are evaporated by subjecting the decompression under the heating condition to recover from the latex of the carboxyl group-containing nitrile rubber, the unreacted carboxyl group-containing monomers are also evaporated together with the α,β-ethylenically unsaturated nitrile monomer, so that a considerable amount of the carboxyl group-containing monomer is contained in the evaporated component, and as a result, the high-purity α,β-ethylenically unsaturated nitrile monomer cannot be obtained and it cannot be recycled. In particular, the α,β-ethylenically unsaturated nitrile monomer is desired to be obtained with high purity in order to recycle the α,β-ethylenically unsaturated nitrile monomer since it cannot be easily separated from the α,β-ethylenically unsaturated nitrile monomer and the carboxyl group-containing monomer. With this respect, when the present inventors have conducted further research, it has been found that, by the effect of the unreacted carboxyl group-containing monomers, the pH of the latex of the carboxyl group-containing nitrile rubber after the emulsion polymerization reaction is usually 5.5 or less, whereas the pH thereof is set to 6.5 or more, and in a state that the pH is set to 6.5 or more, the latex is subjected to the decompression under the heating condition, thereby the evaporated component containing the α,β-ethylenically unsaturated nitrile monomer with a high purity, specifically, one in which the content of monomers other than the α,β-ethylenically unsaturated nitrile monomer is kept low can be recovered.

The pH of the latex of the carboxyl group-containing nitrile rubber may be adjusted to 6.5 or more, but is preferably 6.7 or more, more preferably 7.0 or more, still more preferably 7.05 or more, and particularly preferably 7.5 or more. Further, the upper limit of the pH is not particularly limited, but is preferably set to 9.5 or less, more preferably 9.0 or less, from the viewpoint of appropriately reducing the possibility that the unreacted α,β-ethylenically unsaturated nitrile monomers react with each other to become a dimer or trimer. If the pH of the latex of the carboxyl group-containing nitrile rubber is too low, a substantial amount of the carboxyl group-containing monomer is contained in the evaporated component, so that the α,β-ethylenically unsaturated nitrile monomer cannot be recovered with high purity.

Note that, a method for setting the pH of the latex of the carboxyl group-containing nitrile rubber to 6.5 or more is not particularly limited, but a method of adding a basic compound is preferred since the pH of the latex of the carboxyl group-containing nitrile rubber after the emulsion polymerization reaction usually exhibits a relatively low value of 5.5 or less. The basic compound is not particularly limited, and examples thereof include hydroxides of alkali metals such as sodium hydroxide and potassium hydroxide; carbonates of alkali metals such as sodium carbonate and potassium carbonate; bicarbonates of alkali metals such as sodium hydrogen carbonate; ammonia; organic amine compounds such as trimethylamine and triethanolamine; and the like. Among these, hydroxides of alkali metals are preferred, and potassium hydroxide is more preferred.

In recovering method according to the present invention, when the latex of the carboxyl group-containing nitrile rubber having the pH adjusted to 6.5 or more is subjected to the decompression under the heating condition, a heating temperature is not particularly limited, but is preferably 40 to 80° C., more preferably 45 to 75° C., and still more preferably 50 to 70° C. By setting the heating temperature within the above range, it is possible to increase the amount of the unreacted α,β-ethylenically unsaturated nitrile monomer recovered while preventing deterioration of the carboxyl group-containing nitrile rubber contained in the latex. In addition, in recovering method according to the present invention, when the latex of the carboxyl group-containing nitrile rubber having the pH adjusted to 6.5 or more is subjected to the decompression under the heating condition, the temperature of the latex may be set to a temperature above room temperature, preferably a state heated to the above-described temperature, and it is not necessarily needed to keep heating from an external heat source continuously. For example, after the latex is heated to a predetermined temperature by heating the latex using an external heat source in advance, the heating from the external heat source may be stopped and the decompression may be performed in a state in which the latex is not heated from the outside.

In the recovering method according to the present invention, when the latex of the carboxyl group-containing nitrile rubber having the pH adjusted to 6.5 or more is subjected to the decompression under the heating condition, the pressure reduction condition is not particularly limited, but the degree of pressure reduction is preferably set to −85 kPa (gauge pressure) or less, more preferably −90 kPa (gauge pressure) or less, still more preferably below −90 kPa (gauge pressure), and particularly preferably −95 kPa (gauge pressure) or less, and the lower limit thereof is not particularly limited, but is usually −100 kPa (gauge pressure) or more. By setting the degree of pressure reduction within the above range, while occurrence of defects such as a decrease in the yield of the latex itself by foaming that occurs on the liquid surface of the latex is prevented, it is possible to increase the amount of the unreacted α,β-ethylenically unsaturated nitrile monomer recovered.

In the recovering method according to the present invention, when the latex of the carboxyl group-containing nitrile rubber having the pH adjusted to 6.5 or more is subjected to the decompression under the heating condition, a decompression time under the heating condition is not particularly limited, but is usually 0.5 to 10 hours, preferably 1.0 to 8 hours. In addition, in the embodiment that after the latex is heated to a predetermined temperature by heating the latex using an external heat source in advance, the heating from the external heat source is stopped and the decompression is performed in a state in which the latex is not heated from the outside, the decompression under the heating condition may be terminated when the temperature of the latex decreases to a predetermined temperature after the decompression under the heating condition starts.

In the recovering method according to the present invention, a method for recovering the evaporated component generated by decompressing the latex under the heating condition is not particularly limited, and examples thereof include a method of liquefying the component by a cooling means such as a condenser. Further, when water is contained in the liquefied evaporated component in addition to the α,β-ethylenically unsaturated nitrile monomer, it is possible to recover the α,β-ethylenically unsaturated nitrile monomer by performing an operation such as distillation.

In the recovering method according to the present invention, as the latex of the carboxyl group-containing nitrile rubber, those obtained by emulsion polymerizing the monomer mixture containing the α,β-ethylenically unsaturated nitrile monomer, and the carboxyl group-containing monomer may be used. From the viewpoint that the action and effects according to the present invention becomes more remarkable, in particular, from the viewpoint that mixing of the carboxyl group-containing monomer into the evaporated component can be more appropriately prevented, and thereby the unreacted α,β-ethylenically unsaturated nitrile monomer can be recovered with higher purity, those obtained by emulsion polymerizing monomers containing acrylonitrile and methacrylic acid are preferably used.

In addition, in the recovering method according to the present invention, as the latex of the carboxyl group-containing nitrile rubber, a latex obtained by emulsion polymerizing the monomer mixture containing diene monomer in addition to the α,β-ethylenically unsaturated nitrile monomer and the carboxyl group-containing monomer may be used. In this case, it is preferable to perform a treatment for removing the unreacted diene monomer from the latex prior to the decompression under the heating condition for recovering the α,β-ethylenically unsaturated nitrile monomer.

The treatment for removing the unreacted diene monomer may be performed prior to adjusting the pH of the latex of the carboxyl group-containing nitrile rubber to 6.5 or more, or may be performed after adjusting the pH to 6.5 or more, as long as it is prior to the step of decompression under the heating condition described above. From the viewpoint that the unreacted α,β-ethylenically unsaturated nitrile monomer can be recovered with higher purity, it is preferable to perform the treatment for removing the unreacted diene monomer after adjusting the pH of the latex of the carboxyl group-containing nitrile rubber to 6.5 or more.

The treatment for removing the unreacted diene monomer is not particularly limited, and examples thereof include a method in which the latex is subjected to the decompression under a relatively low temperature condition at a temperature of preferably 20 to 50° C., more preferably 25 to 45° C., and under the degree of pressure reduction of preferably −30 to −100 kPa (gauge pressure), more preferably −40 to −95 kPa (gauge pressure), and still more preferably −50 to −90 kPa (gauge pressure), prior to adjusting the pH of the latex of the carboxyl group-containing nitrile rubber to 6.5 or more, or after adjusting the pH to 6.5 or more.

The treatment for removing the unreacted diene monomer is preferably carried out under a mild condition rather than with a reduced pressure under the heating condition for evaporating the unreacted α,β-ethylenically unsaturated nitrile monomer. Thus, in the treatment for removing the unreacted diene monomer, while preventing evaporation of the unreacted α,β-ethylenically unsaturated nitrile monomer, mainly the unreacted diene monomer can be sufficiently removed, and then the unreacted α,β-ethylenically unsaturated nitrile monomer can be recovered at a high recovery ratio and still at a higher purity by decompressing the latex under the heating condition from which the unreacted diene monomer has been sufficiently removed in advance.

Therefore, in the recovering method according to the present invention, it is preferable that each of a temperature and a pressure in the treatment for removing the unreacted diene monomer is lower than that of the heating temperature and the degree of pressure reduction for evaporating the unreacted diene monomer, respectively. The low degree of pressure reduction means that the pressure achieved by the decompression is relatively close to the ambient pressure. For example, in the recovering method according to the present invention, the treatment for mainly removing the unreacted diene monomer is carried out at a temperature of 25 to 45° C., at the degree of pressure reduction of −50 to −90 kPa (gauge pressure), and then the decompression can be carried out at a temperature of 50-70° C. and at the degree of pressure reduction of less than −90 kPa (gauge pressure), when mainly evaporating the unreacted α,β-ethylenically unsaturated nitrile monomer.

In addition, in the recovering method according to the present invention, as a the latex of the carboxyl group-containing nitrile rubber, a latex obtained by emulsion polymerizing the monomer mixture containing the α,β-ethylenically unsaturated nitrile monomer, the carboxyl group-containing monomer, and the diene monomer, and additionally other monomers copolymerizable with the above-mentioned monomers may be used. Further, from the viewpoint that the action and effects according to the present invention becomes more remarkable, in particular, from the viewpoint that mixing of the monomers other than the α,β-ethylenically unsaturated nitrile monomer into the evaporated component can be more appropriately prevented, and thereby the unreacted α,β-ethylenically unsaturated nitrile monomer can be recovered with higher purity, a latex obtained by emulsion polymerizing the monomer mixture substantially consisting of the α,β-ethylenically unsaturated nitrile monomer, the carboxyl group-containing monomer, and the diene monomer is preferred, and a latex obtained by emulsion polymerizing the monomer mixture substantially consisting of acrylonitrile, methacrylic acid and 1,3-butadiene is particularly preferred.

As described above, according to the recovering method of the present invention, from the latex of the carboxyl group-containing nitrile rubber obtained by emulsion polymerizing the monomer mixture containing the α,β-ethylenically unsaturated nitrile monomer and the carboxyl group-containing monomer, the unreacted α,β-ethylenically unsaturated nitrile monomer contained in the latex can be recovered with a high purity in the form of the evaporated component such as condensate water and the like. Specifically, the content ratio of the monomers, which include the carboxyl group-containing monomer, other than the α,β-ethylenically unsaturated nitrile monomer contained in the evaporated component from the latex can be kept as low as preferably less than 0.5 parts by weight, more preferably less than 0.3 parts by weight, and still more preferably less than 0.1 parts by weight, with respect to 100 parts by weight of the α,β-ethylenically unsaturated nitrile monomer. Therefore, according to the recovering method of the present invention, the recovered α,β-ethylenically unsaturated nitrile monomer can be suitably recycled as a raw material for various nitrile rubbers containing the carboxyl group-containing nitrile rubber, thereby contributing to improvement in productivity.

EXAMPLES

Hereinafter, the present invention will be described specifically by way of Examples and Comparative Examples. In each example, the term "parts" is based on weight unless otherwise specified. Note that the tests and the evaluations were carried out as follows.

Production Example 1

68 parts of 1,3-butadiene, 25 parts of acrylonitrile, 7 parts of methacrylic acid, 0.5 parts of t-dodecylmercaptan as a chain transfer agent, 200 parts of deionized water, 2.0 parts of sodium dodecylbenzenesulfonate, 1.0 parts of sodium β-naphthalenesulfonic acid formalin condensate, 0.15 parts of cumene hydroperoxide, and the appropriate amount of iron, a reducing agent, and a chelating agent were charged to a pressure resistant polymerization reaction vessel equipped with a stirrer, and the polymerization temperature was maintained at 5° C., thereby polymerization was started. Then, when the polymerization conversion ratio became 80%, 0.05 parts of sodium nitrite as a polymerization terminator and 1.6 parts of a 25 wt % aqueous dispersion of 2,5-di-t-amylhydroquinone (trade name "ANTAGE DAH", manufactured by KAWAGUCHI CHEMICAL INDUSTRY CO., LTD.) as a polymerization terminator (0.4 parts in terms of 2,5-di-t-amylhydroquinone) were added to stop the polymerization reaction, and then 0.25 parts of an aqueous solution of 2 wt % potassium hydroxide was added, and a solid content concentration was adjusted with ion-exchanged water to obtain a latex of a carboxyl group-containing nitrile rubber (solid content concentration: 26 wt %) having a pH of 4.6. The composition of the carboxyl group-containing nitrile rubber contained in the obtained latex was 68 wt % of 1,3-butadiene units, 25 wt % of acrylonitrile units, and 7 wt % of methacrylic acid units.

Example 1

The latex of the carboxyl group-containing nitrile rubber obtained in Production Example 1 was charged to the pressure resistant vessel so that the amount of the carboxyl group-containing nitrile rubber contained in the latex was 100 parts. 0.75 parts of aqueous solution of 2 wt % potassium hydroxide and 0.3 parts of 2,4-bis(octylthiomethyl)-6-methylphenol (trade name "Irganox 1520L", manufactured by BASF SE) was added to the pressure resistant vessel, so as to adjust the pH of the latex to 7.0. Then, a treatment for removing the unreacted 1,3-butadiene was performed by heating the latex having the pH adjusted to 7.0 to 30° C. by a heater provided in the pressure resistant vessel; and, in a state of being heated to 30° C., decompressing the inside of the pressure resistant vessel to the degree of pressure reduction of −70 kPa (gauge pressure) with a pressure reducing pump connected to the pressure resistant vessel via a condenser in the middle of the pressure reducing line. Note that the treatment for removing the 1,3-butadiene was terminated at a time point when foaming was no longer observed. Next, after the solid content concentration of the latex was re-adjusted to 26 wt % by adding ion-exchanged water to the latex from which the unreacted 1,3-butadiene was removed, a pH measurement was performed. The pH of the latex was 7.0.

Then, in the pressure resistant vessel, after removing the unreacted 1,3-butadiene, 200 g of the latex of the carboxyl group-containing nitrile rubber (solid content concentration: 26 wt %) having the pH of 7.0 was heated to a temperature of 60° C. by a heater provided in the pressure resistant vessel, and at a stage at which the temperature reached 60° C., heating by the heater was stopped. And then, a treatment for recovering the unreacted acrylonitrile was carried out by decompressing the inside of the pressure resistant vessel at the degree of pressure reduction of −95 kPa (gauge pressure) by the pressure reducing pump connected to the pressure resistant vessel via the condenser in the middle of the pressure reducing line. The treatment for recovering the unreacted acrylonitrile was performed until the temperature of the latex dropped to 40° C. Then, in Example 1, the content of the unreacted acrylonitrile and the content of the unreacted methacrylic acid contained in each of the latex before recovering acrylonitrile, the latex after recovering acrylonitrile, and condensate water condensed by the condenser were measured at this stage. Measurement results are shown in Table 1. Note that the contents of the unreacted acrylonitrile and unreacted methacrylic acid were measured by gas chromatography (GC). In addition, 1,3-butadiene was detected in none of them (the same applies to Examples 2 to 4 and Comparative Examples 1 and 2).

Example 2

In the same manner as Example 1, except that a pH adjustment was performed so that the pH of the latex was 6.6 when the pH adjustment was performed by potassium hydroxide, the latex of the carboxyl group-containing nitrile rubber was subjected to the treatment for removing the unreacted 1,3-butadiene and that for removing the unreacted acrylonitrile. Also in Example 2, the content of the unreacted acrylonitrile and the content of the unreacted methacrylic acid contained in each of the latex before recovering acrylonitrile, the latex after recovering acrylonitrile, and the condensate water condensed by the condenser were measured. Measurement results are shown in Table 1.

Example 3

In the same manner as in Example 1, except that the pH adjustment was performed so that the pH of the latex was 8.0 when the pH adjustment was performed by potassium hydroxide, the latex of the carboxyl group-containing nitrile rubber was subjected to the treatment for removing the unreacted 1,3-butadiene and that for removing the unreacted acrylonitrile. Also in Example 3, the content of the unreacted acrylonitrile and the content of the unreacted methacrylic acid contained in each of the latex before recovering acrylonitrile, the latex after recovering acrylonitrile, and the condensate water condensed by the condenser were measured. Measurement results are shown in Table 1.

Example 4

In the same manner as in Example 1, except that the pH adjustment was performed so that the pH of the latex was 9.0 when the pH adjustment was performed by potassium hydroxide, the latex of the carboxyl group-containing nitrile rubber was subjected to the treatment for removing the unreacted 1,3-butadiene and that for removing the unreacted acrylonitrile. Also in Example 4, the content of the unreacted acrylonitrile and the content of the unreacted methacrylic acid contained in each of the latex before recovering acrylonitrile, the latex after recovering acrylonitrile, and the condensate water condensed by the condenser were measured. Measurement results are shown in Table 1.

Comparative Example 1

In the same manner as Example 1, except that the pH adjustment with potassium hydroxide was not performed, the latex of the carboxyl group-containing nitrile rubber was subjected to the treatment for removing the unreacted 1,3-butadiene and that for removing the unreacted acrylonitrile. Incidentally, in Comparative Example 1, when the treatment for removing the unreacted 1,3-butadiene and that for removing the unreacted acrylonitrile were performed, the pH of the latex was 4.6 in each treatment. Also in Comparative Example 1, the content of the unreacted acrylonitrile and the content of the unreacted methacrylic acid contained in each of the latex before recovering acrylonitrile, the latex after recovering acrylonitrile, and the condensate water condensed by the condenser were measured. Measurement results are shown in Table 1.

Comparative Example 2

In the same manner as Example 1, except that the pH adjustment was performed so that the pH of the latex was 6.0 when the pH adjustment with potassium hydroxide was performed, the latex of the carboxyl group-containing nitrile rubber was subjected to the treatment for removing the unreacted 1,3-butadiene and that for removing the unreacted acrylonitrile. Also in Comparative Example 2, the content of the unreacted acrylonitrile and the content of the unreacted methacrylic acid contained in each of the latex before recovering acrylonitrile, the latex after recovering acrylonitrile, and the condensate water condensed by the condenser were measured. Measurement results are shown in Table 1.

TABLE 1

|  | Example | | | | Comparative Example | |
| --- | --- | --- | --- | --- | --- | --- |
|  | 1 | 2 | 3 | 4 | 1 | 2 |
| Latex before recovering acrylonitrile | | | | | | |
| Weight of latex [g] | 200 | 200 | 200 | 200 | 200 | 200 |
| pH of latex | 7.0 | 6.6 | 8.0 | 9.0 | 4.6 | 6.0 |
| Solid content concentration [wt %] | 26 | 26 | 26 | 26 | 26 | 26 |
| Content of unreacted acrylonitrile [ppm by weight] | 10,421 | 10,305 | 10,395 | 10,395 | 10,371 | 10,400 |
| Content of unreacted methacrylic acid [ppm by weight] | 2,925 | 2,930 | 2,951 | 2,951 | 2,969 | 2,928 |

TABLE 1-continued

|  | Example | | | | Comparative Example | |
|---|---|---|---|---|---|---|
|  | 1 | 2 | 3 | 4 | 1 | 2 |
| Latex after recovering acrylonitrile | | | | | | |
| Weight of latex [g] | 150 | 150 | 150 | 150 | 150 | 150 |
| pH of latex | 7.1 | 6.5 | 8.1 | 9.2 | 4.8 | 6.1 |
| Solid content concentration [wt %] | 35 | 35 | 35 | 35 | 35 | 35 |
| Content of unreacted acrylonitrile [ppm by weight] | 468 | 451 | 420 | 420 | 137 | 135 |
| Content of unreacted methacrylic acid [ppm by weight] | 3,501 | 3,495 | 3,505 | 3,505 | 3,400 | 3,450 |
| Condensate water condensed in condenser | | | | | | |
| Weight of condensate water [g] | 29.00 | 29.00 | 29.00 | 29.00 | 29.00 | 29.00 |
| pH of condensate water | 5.0 | 4.4 | 6.0 | 6.8 | 3.2 | 3.3 |
| Content of unreacted acrylonitrile [ppm by weight] | 10,897 | 10,881 | 10,901 | 10,888 | 20,692 | 20,700 |
| Content of unreacted methacrylic acid [ppm by weight] | 7 | 8 | 4 | 2 | 1,316 | 1,301 |

As shown in Table 1, when recovery of acrylonitrile was performed by adjusting the pH of the latex of the carboxyl group-containing nitrile rubber to 6.5 or more and decompressing under the heating condition, it was confirmed that the content of the unreacted methacrylic acid in the recovered condensate water was kept extremely low, and the unreacted acrylonitrile was recovered with high purity which could be suitably used for the recycle (Examples 1 to 4).

On the other hand, when recovery of acrylonitrile was performed by adjusting the pH of the latex of the carboxyl group-containing nitrile rubber below 6.5 and decompressing under the heating condition, the results showed that a considerable amount of the unreacted methacrylic acid was contained in the recovered condensate water, and thus, the unreacted acrylonitrile recovered had low purity which was not suitable for the recycle (Comparative Examples 1 and 2).

The invention claimed is:

1. A method for recovering an unreacted $\alpha,\beta$-ethylenically unsaturated nitrile monomer contained in a latex of a carboxyl group-containing nitrile rubber obtained by emulsion polymerizing a monomer mixture comprising an $\alpha,\beta$-ethylenically unsaturated nitrile monomer, a carboxyl group-containing monomer, and a diene monomer, comprising the steps of:
   adjusting a pH of the latex of the carboxyl group-containing nitrile rubber to 6.5 or more;
   performing a treatment for removing the unreacted diene monomer before or after the step of adjusting the pH of the latex of the carboxyl group-containing nitrile rubber to 6.5 or more,
   decompressing the latex of the carboxyl group-containing nitrile rubber having the pH adjusted to 6.5 or more that is obtained by removing the unreacted diene monomer under a heating condition; and
   recovering a component evaporated by the decompression under the heating condition; wherein
   a pressure reduction condition is −100 to −85 kPa in a gauge pressure when decompressing the latex of the carboxyl group-containing nitrile rubber under the heating condition, and
   a pressure reduction condition in a treatment for removing the unreacted diene monomer is −70 to −50 kPa in a gauge pressure.

2. The method for recovering the unreacted $\alpha,\beta$-ethylenically unsaturated nitrile monomer according to claim 1, wherein the heating temperature is set to 40 to 80° C. when decompressing the latex of the carboxyl group-containing nitrile rubber under the heating condition.

3. The method for recovering the unreacted $\alpha,\beta$-ethylenically unsaturated nitrile monomer according to claim 1, wherein the latex of the carboxyl group-containing nitrile rubber is obtained by emulsion polymerizing the monomer mixture comprising the diene monomer, acrylonitrile and methacrylic acid.

4. The method for recovering the unreacted $\alpha,\beta$-ethylenically unsaturated nitrile monomer according to claim 1, wherein a polymerization conversion ratio in the emulsion polymerization is 60 to 95%.

5. The method for recovering the unreacted $\alpha,\beta$-ethylenically unsaturated nitrile monomer according to claim 1, wherein a temperature and a pressure in the treatment for removing the unreacted diene monomer are respectively lower than a heating temperature and a degree of pressure reduction when decompressing the latex of the carboxyl group-containing nitrile rubber under the heating condition.

* * * * *